S. C. GAMBLE.
MILK PAN.
APPLICATION FILED AUG. 14, 1911.
1,043,585.
Patented Nov. 5, 1912.
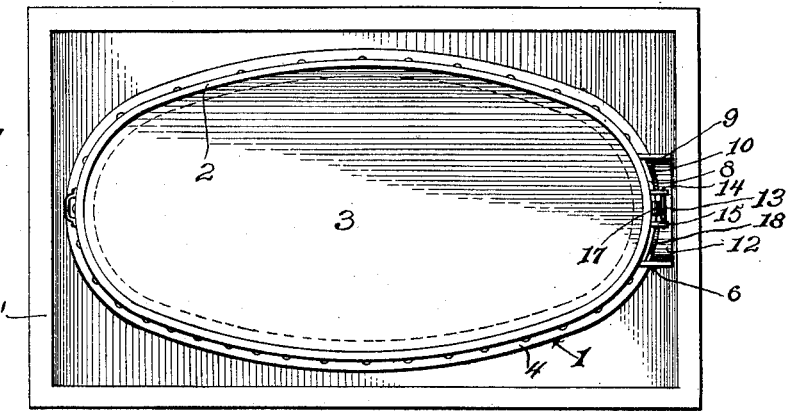
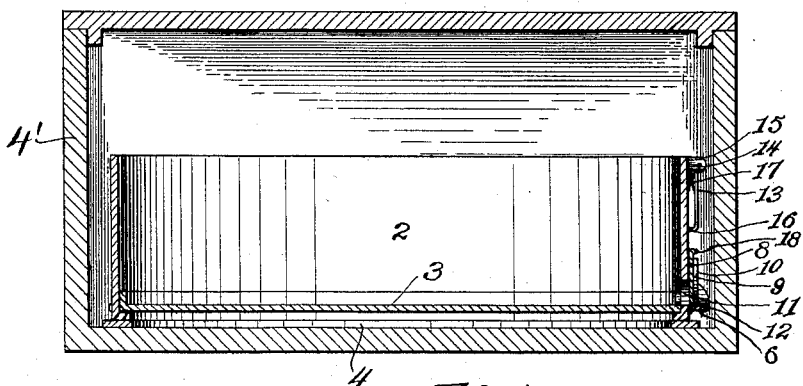
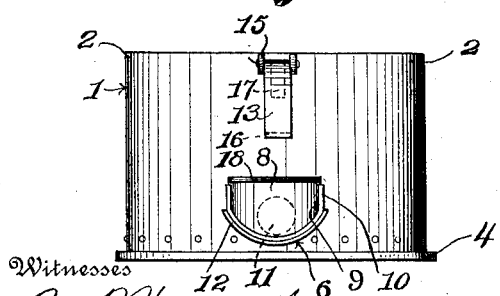
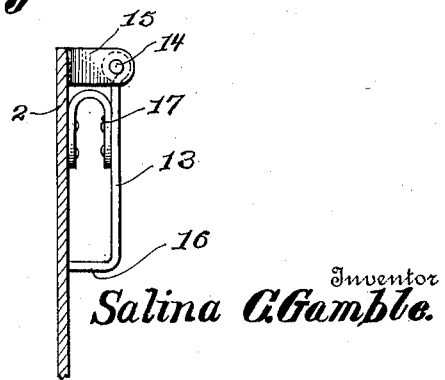
Inventor
Salina C. Gamble.

UNITED STATES PATENT OFFICE.

SALINA C. GAMBLE, OF PHOENIX, ARIZONA.

MILK-PAN.

1,043,585. Specification of Letters Patent. Patented Nov. 5, 1912.

Application filed August 14, 1911. Serial No. 643,915.

*To all whom it may concern:*

Be it known that I, SALINA C. GAMBLE, a citizen of the United States, residing at Phoenix, in the county of Maricopa and State of Arizona, have invented certain new and useful Improvements in Milk-Pans, of which the following is a specification.

My invention relates to new and useful improvements in milk pans and the like.

An object of my invention is to improve devices of this character rendering them comparatively cheap in manufacture, simple in construction, durable and efficient in use and which may be placed, owing to its particular shape, in an ice box or other cooling chamber without taking up the quantity of space as used by the milk pans in present use.

Another object of my invention is to provide a valve at the lower end of a milk pan whereby the milk in the bottom of the receptacle can be separated from the cream which will provide a simple and comparatively cheap separator to manufacture.

With these and other objects in view my invention consists of a novel construction, combination and arrangement of parts which will be fully hereinafter described and shown in the drawing in which:

Figure 1 shows my improved milk pan when placed into a cooling receptacle; Fig. 2 shows a vertical longitudinal section through the same; Fig. 3 shows a front elevation of my improved milk pan, and Fig. 4 is a detail section through the milk pan showing my improved catch in side elevation.

Referring now more particularly to the drawing wherein like parts are indicated by like characters of reference, the numeral 1 indicates my improved milk receptacle which is elliptical in shape and consists of side walls 2 and a bottom 3 which may be made of any suitable material. The bottom 3 is spaced from the lower edge of the side walls and is secured thereto by means of rivets or the like. The ends of the side walls 2 are supported upon a ring 4 which is also elliptical in shape and is secured to the side walls by means of rivets or the like.

It will be seen from the foregoing that I have constructed a receptacle which will hold a quantity of milk suitable for persons who have but a limited amount for their own use and which can be placed in an ice box or other suitable cooling chamber without taking up much space. After the receptacle has been placed in a suitable chamber for a while the cream will raise on top of the milk and to separate the milk from the cream I provide a suitable valve 6 at the lower end of the side members 2. This valve 6 consists of a sliding gate 8 made of hard rubber or the like curved at its lower end and it is adapted to slide in grooves 9 formed by a similar curved guide 10 which is riveted or otherwise secured to the sides of the receptacle adjacent an aperture 11 formed therein. A curved lip 12 is secured to the receptacle below the valve whereby the milk flowing from the opening formed in the receptacle will be guided into a suitable receiving receptacle not shown.

To provide means for holding the sliding gate 8 in a raised position, I provide a spring pressed catch 13, which is pivoted at one end as at 14 to ears 15 formed on the side of the receptacle and having its opposite end bent at right angles as at 16 to engage over the rib or handle 18 formed on the sliding gate when in a raised position. A spring 17 is secured at one end to the receptacle and the opposite end to the catch 13 by means of rivets and the like and which will normally hold the bent end 16 of the catch into engagement with the top of the sliding gate.

Having described my invention, what I desire Letters Patent on is:

In an elliptical shaped milk receptacle having an opening formed adjacent the lower end thereof, a guide secured to said receptacle, a valve adapted to slide in said guide for closing said opening, a curved lip formed below said opening, a spring pressed catch secured to said receptacle and a lip formed on one end of said catch for engaging said valve to hold the same in an opened position substantially as described.

In testimony whereof I affix my signature in presence of two witnesses.

SALINA C. GAMBLE.

Witnesses:
 R. C. STANFORD,
 ABBIE SMITH.